235-382 SR

6/3/86 OR 4,593,185

United States Patent [19]

Patzelt et al.

[11] Patent Number: 4,593,185

[45] Date of Patent: Jun. 3, 1986

[54] SAFETY LOCK

[75] Inventors: Ingeborg Patzelt; Werner Horn, both of Berlin, Fed. Rep. of Germany

[73] Assignee: Zeiss Ikon AG, Fed. Rep. of Germany

[21] Appl. No.: 580,747

[22] Filed: Feb. 16, 1984

[30] Foreign Application Priority Data

Feb. 18, 1983 [DE] Fed. Rep. of Germany ....... 3305614

[51] Int. Cl.[4] ............ G06K 5/00

[52] U.S. Cl. ............ 235/382; 235/454; 235/475; 361/172

[58] Field of Search ............ 235/382, 462, 475, 454; 361/172, 173

[56] References Cited

U.S. PATENT DOCUMENTS

| | | | |
|---|---|---|---|
| 3,784,795 | 1/1974 | Tuhro | 235/462 |
| 4,369,481 | 1/1983 | Early | 361/173 |
| 4,464,566 | 8/1984 | Silverman et al. | 235/382 |

*Primary Examiner*—David L. Trafton
*Attorney, Agent, or Firm*—Hill, Van Santen, Steadman & Simpson

[57] ABSTRACT

The present invention provides a safety lock actuatable with a flat key carrying a code. The code is digitally generated by a laser beam and is sensed by detector laser beam upon or after the introduction of the key into the lock. The digital coding is produced by means of burning discrete depressions into a suitable layer on the key with a sufficiently strong laser beam and the sensing of the coding is done by means of a weaker laser beam.

3 Claims, 6 Drawing Figures

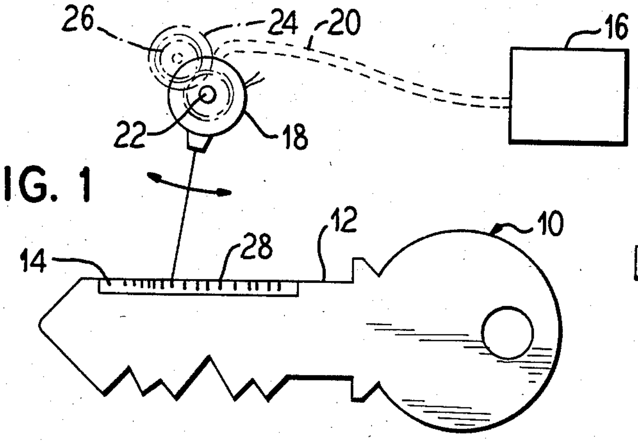
FIG. 1
FIG. 2
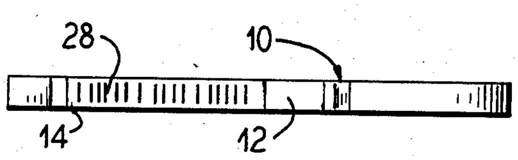
FIG. 4
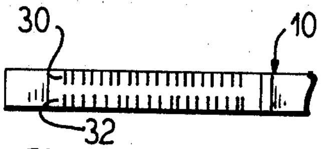
FIG. 3
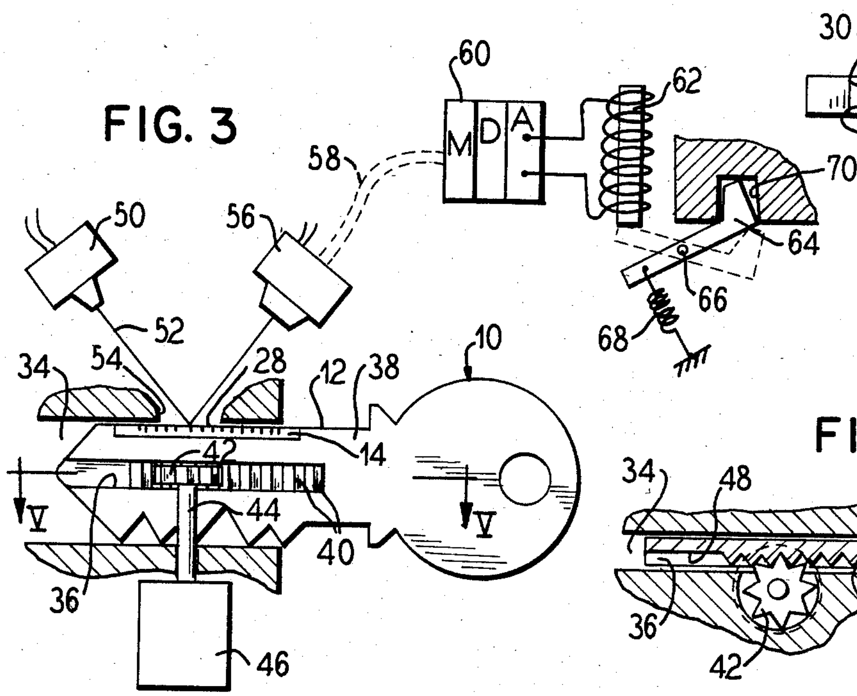
FIG. 5
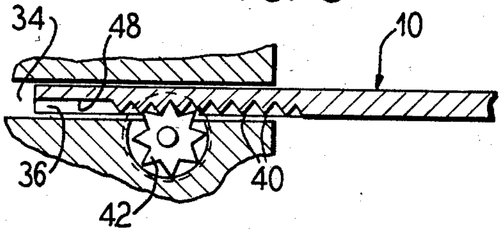
FIG. 6
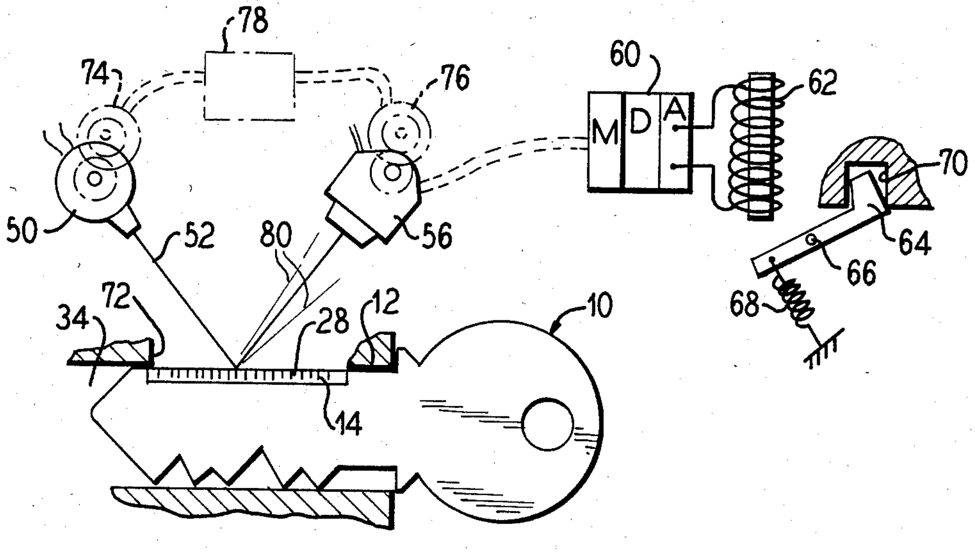

SAFETY LOCK

BACKGROUND OF THE INVENTION

1. Field of the Invention

The present invention relates to a safety lock and more particularly to a lock that is actuatable with a key carrying a laser generated code.

2. Description of the Prior Art

Locks being actuatable with flat keys such as a card are used in which a magnetic code is carried on the card which is read by a magnetic reader. The amount of information storable on such keys is somewhat limited due to the nature of magnetic information storage. Also, a sufficiently large area must be provided for the strip of magnetic material upon which the information is recorded. Generally, these size requirements have prevented the use of standard door keys in association with stored information.

SUMMARY OF THE INVENTION

The present invention provides for a flat key, such as a regular door lock key with a flat surface, or a flat card, which has an information coding digitally generated by a laser beam carried thereon. The coding is sensed by a detector laser beam after the key has been introduced into the lock or while it is being introduced into the lock and the sensed information is compared with stored information to determine if a valid key has been entered into the lock.

The coding on the key is produced in a known manner by means of burning discrete depressions into a layer provided for on the surface of the key by a sufficiently strong laser beam. The sensing of the digital information is done by means of a weaker laser beam which is produced in a laser generator provided in the door or in the wall containing the lock and the laser beam is conducted into the lock by means of a glass fiber.

The coding or information track produces a digital signal, corresponding to the information pattern, at the output of a receiver when sensed by the weaker laser beam relative to the stationary or co-moving receiver. The digital signal can be tapped and processed further by means other than those associated with the lock. The digital signal is applied to an identification memory after conversion and a discriminator checks for coincidence. The identification memory forwards an amplified signal to an enabling means after checking the identification and after finding a coincidence with the stored identification. The enabling means then mechanically unlocks the lock.

The sensing of the key can occur in conjunction with a motor driven introduction and temporary retention of the key into the sensing channel, or the sensing can be done after the key has been completely introduced into the sensing channel. In the first method, the means carrying and emitting the sensing laser beam is stationary, and in the second method the means carrying and emitting the sensing laser beam can be pivoted such that the code segment or code track is scanned.

The use of the laser generated coding provides the possibility of accommodating a high informational content on the key. It also allows for the production of subordinated or superordinated keys carrying corresponding lesser or greater informational content and further allows for the production of a master key.

Even greater informational content can be provided on the key by generating a plurality of code tracks that are sensed by one or more correspondingly guided laser beams and whose acquired information are supplied to the interpretation unit.

The key can be used in conjunction with or independently from a conventional lock with pins and tumblers.

BRIEF DESCRIPTION OF THE DRAWINGS

FIG. 1 is a schematic view of a laser encoding a key.

FIG. 2 is a plan view of the key showing the code track.

FIG. 3 is a side schematic view of the key being inserted into the lock and being read by a second laser.

FIG. 4 is a partial plan view of a key showing a plurality of codings.

FIG. 5. is a sectional view of the key driving means taken generally along the lines V—V of FIG. 3.

FIG. 6 is a side schematic view of an alternative embodiment of the key scanner showing pivoted laser and sensing apparatus.

DESCRIPTION OF THE PREFERRED EMBODIMENT

In FIG. 1 there is schematically shown a key 10 which can be in the form of a standard door key or a card so long as it has a relatively flat surface, such as the flat upper surface 12 on the spine of the key shown. A layer 14 of suitable material is provided on the flat surface 12 which can be burned by a laser beam generated by a laser generator unit 16. The laser beam is conducted to an emission head 18 through a glass fiber optical system 20. The emission head 18 is pivotable about a central axis 22, being driven by a motor 24 through a suitable gear arrangement 26.

A coding, consisting of discrete depressions 28 is burned into the material 14 on the flat surface 12 of the key by pivoting the emission head 16 about its axis 22. Although the depressions are shown in the figures, in reality the actual depressions are so fine that they cannot be shown in their actual size. Arrangements can be made for lateral movement of the emission head 16 to provide depressions having a sufficient length so as to form grooves rather than points or holes to avoid the necessity of highly precise alignment of the later sensing of the depressions.

FIG. 4 shows the key 10 having two separate code tracks 30, 32 which allows for twice as much informational content to be recorded by the laser. Any number of code tracks can be utilized and the code tracks can be of any length, the only limitation on the number or length of the code tracks is the physical dimensions of the flat area of the key.

In FIG. 3 the key 10 is shown as it is being inserted into a sensing channel 34 of the lock mechanism. In this embodiment, the key 10 has a groove 36 in a side face 38 of the key which has a plurality of teeth 40. As seen in FIGS. 3 and 5, the teeth are engageable by a toothed gear 42 which is carried on a rotatable shaft 44 driven by a motor 46. A first part 48 of the groove 36 is provided without teeth to allow for partial insertion of the key 10 into the sensing channel 34 before engagement with the gear 42.

When the teeth 40 engage with the gear 42, the motor 46 is activated and the key 10 is uniformly drawn into the sensing channel 34. Other means could be utilized to draw the key into the sensing channel such as apposed pinch rollers or similar means known in the art which will provide a uniform insertion or introduction of the key 10 into the sensing channel 34. As this insertion occurs, a laser beam generator 50 emits a laser beam 52 which passes through a window or opening 54 into the sensing channel 30 and strikes the flat surface 12 of the key 10 carrying the coding. The beam 52 is reflected from the flat surface 12 and the reflected beam is received in a receiver unit 56. The reflected beam, which has been modulated by the coding, proceeds through a glass fiber 58 to a unit 60 which contains a memory unit M which has stored in it the correct information coding. A discriminator portion of the unit 60 compares the received modulated reflected laser beam with the stored information and, if there is a coincidence of the sensed and stored information, an amplifier portion A of the unit 60 energizes a magnet means 62 which operates to release a catch mechanism 64.

The catch mechanism comprises a dog which is pivotally mounted at 66 and is biased by a spring 68 into a locked position such that an extension leg 69 of the dog 64 is received in a notch 70. When the magnet means 62 is energized, the magnetic force overcomes the spring force and pivots the dog 64 around the pin 66 thereby moving the extension portion 69 of the dog out of engagement with the notch 70. This then unlocks the lock. Deenergization of the magnet means 62 would result in an automatic relatching of the lock.

An alternative embodiment is shown in FIG. 6 in which the key 10 is manually inserted into the sensing channel 34 as far as is possible. Once the key 10 has been inserted all the way into the channel 34, the laser beam generator 50 is activated and directs the laser beam 52 toward the flat upper surface 12 of the key 10. An enlarged window 72 is provided to allow the laser generator 50, which is now pivotable, to direct the beam to the entire length of the code track. Motors 74, 76 are provided to pivotally move both the laser generator 50 and the receiving unit 56 to allow the laser beam to scan the entire length of the code track. A control unit 78 controls the operation of the motors 74 and 76 as they pivot the laser and receiver. As before, the reflected beam, which in this embodiment could be a diffused beam as shown at 80 to allow for simple reception of the beam, is carried along the glass fiber 58 to the unit 60 for activating the magnet means 62 upon detection of the stored coding.

The laser generator 50 and receiver 56 can be provided in the door or in the wall containing the lock. If more than one code track is supplied on the key 10, a plurality of laser generators 50 can be utilized to read the various code tracks or, means can be provided to laterally move the one laser generator 50 to sequentially read each of the code tracks.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A lock and key combination particularly characterized by:

a key having an elongated spine on which is formed a coding surface, said coding surface being formed with a thin laser beam generated plethora of burned coating pits having depth modulation formed as a function of selectively varied laser beam energy, and having spacing variations formed as a function of selected relative movement between the coating surface and the laser beam during burning, thereby to provide a maximum plurality of code tracks in a minimum of space and capable of modulating a signal laser beam projected thereon to reflect both depth and spacing variables, and a lock for receiving said key comprising housing means including a sensing channel for receiving said key in inserted relation therein, said housing having window means in register with that portion of said sensing channel in alignment with said coding surface on said key, and sensing means in alignment with said window means including a laser signal beam generator for directing a laser signal beam at said coding surface for reflection of modulated signal beam therefrom, and a receiver unit for receiving the reflected laser signal beam after it has been modulated by the code tracks to generate a digital signal, said sensing means comprising means for effecting relative uniform movement between said key and said laser signal beam generator, whereby the modulated signal beam will generate a digital signal which is responsive to variations in both the depth modulations and the spacing alignment of the coding tracks, and memory and discriminator actuating means for receiving and comparing the digital signal to determine authenticity of the key and for thereafter actuating a lock release in response to an authentic key.

2. A lock and key combination as defined in claim 1, wherein said means for effecting relative movement more particularly comprises electric motor drive means, and interengaging mechanical means between said key and said motor drive means actuatable upon insertion of the key into the sensing channel, whereby said key is uniformly moved past said window means with said code tracks in register with the laser signal beam, thereby to generate a digital signal which is responsive to both depth modulations and spacing variations of the code tracks.

3. A lock and key combination as defined in claim 1, wherein said means for effecting relative movement more particularly comprises motor driven means connected to driven elements including said laser signal beam generator and said receiver unit to synchronously move said elements through a uniform scan pattern relative to the code tracks on the key, thereby to generate a digital signal which is responsive to both the depth modulations and the spacing dimensions of the code tracks.

* * * * *